(12) United States Patent
Fujimura et al.

(10) Patent No.: US 6,900,838 B1
(45) Date of Patent: May 31, 2005

(54) METHOD OF PROCESSING IMAGE SIGNAL FROM SOLID-STATE IMAGING DEVICE, IMAGE SIGNAL PROCESSING APPARATUS, IMAGE SIGNAL GENERATING APPARATUS AND COMPUTER PROGRAM PRODUCT FOR IMAGE SIGNAL PROCESSING METHOD

(75) Inventors: Nobuaki Fujimura, Kokubunji (JP); Makoto Suzuki, Higashimurayama (JP); Katsumasa Ueno, Kodaira (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 819 days.

(21) Appl. No.: 09/671,118

(22) Filed: Sep. 28, 2000

(30) Foreign Application Priority Data

Oct. 14, 1999 (JP) ............................ 11-293035

(51) Int. Cl.[7] .................. H04N 9/083; H04N 5/208; H04N 1/46; G06K 9/32
(52) U.S. Cl. ................ 348/273; 348/280; 348/252; 382/300; 358/525
(58) Field of Search ...................... 348/240.2, 273, 348/280, 272, 281, 282, 241, 251, 252, 224.1, 333.05; 382/300, 263, 264, 266; 358/525; 250/208.1

(56) References Cited

U.S. PATENT DOCUMENTS

| | | | | |
|---|---|---|---|---|
| 4,876,590 A | * | 10/1989 | Parulski .................... | 348/281 |
| 5,596,367 A | * | 1/1997 | Hamilton et al. ........... | 348/272 |
| 6,181,376 B1 | * | 1/2001 | Rashkovskiy et al. ...... | 348/273 |
| 6,323,901 B1 | * | 11/2001 | Ukita ........................ | 348/273 |
| 6,366,318 B1 | * | 4/2002 | Smith et al. ................. | 348/272 |
| 6,421,084 B1 | * | 7/2002 | Chang et al. ................ | 348/273 |
| 6,424,753 B1 | * | 7/2002 | Yamaguchi .................. | 382/300 |
| 6,476,865 B1 | * | 11/2002 | Gindele et al. ............. | 348/277 |
| 6,526,181 B1 | * | 2/2003 | Smith et al. ................. | 382/275 |
| 6,593,965 B1 | * | 7/2003 | Miyamoto ................... | 348/280 |
| 6,697,110 B1 | * | 2/2004 | Jaspers et al. ............... | 348/272 |
| 2002/0063899 A1 | * | 5/2002 | Acharya et al. ............. | 358/302 |

FOREIGN PATENT DOCUMENTS

| | | |
|---|---|---|
| JP | 984031 | 3/1997 |
| JP | 11146410 | 5/1999 |

* cited by examiner

*Primary Examiner*—Wendy R. Garber
*Assistant Examiner*—John M. Villecco
(74) *Attorney, Agent, or Firm*—Mattingly, Stanger, Malur & Brundidge, P.C.

(57) ABSTRACT

An image signal processing method and an image signal processing apparatus for processing the color component signal obtained from a solid-state image pickup device including an arrangement of a plurality of photoelectric elements and a color filter arranged in the light receiving section of each pixel corresponding to the photoelectric element, an image signal generating apparatus and a computer program product for the image signal processing method. A color component signal is fetched from a designated pixel corresponding to the photoelectric element having a filter that can transmit the green light on a line of the solid-state image pickup device. A color component signal is also fetched from a pixel corresponding to the photoelectric element having a filter for transmitting at least the green light on another line, which pixel is located in the neighborhood of the designated pixel. Further, based on a plurality of the color signals fetched in the foregoing steps, the value of the color component signal of the designated pixel having the filter for transmitting at least the green light is determined.

8 Claims, 12 Drawing Sheets

FIG. 3A
PRIOR ART

|   | 1 | 2 | 3 | ... | n-1 | n | n+1 | ... |
|---|---|---|---|---|---|---|---|---|
| 1 | $G_{11}$ | $B_{12}$ | $G_{13}$ | ... |  | $B_{1n}$ | | ..... |
| 2 | $R_{21}$ | $G_{22}$ | $R_{23}$ | | | | | |
| 3 | $G_{31}$ | $B_{32}$ | $G_{33}$ | $\ddots$ | | | | |
| $\vdots$ | $\vdots$ | $\vdots$ | | $\ddots$ | | | | |
| m-1 | | | | | $G^{m-1}_{n-1}$ | $B^{m-1}_{n}$ | $G^{m-1}_{n+1}$ | |
| m | $R_{m1}$ | | ... | | $R^{m}_{n-1}$ | $G_{mn}$ | $R^{m}_{n+1}$ | ... |
| m+1 | $\vdots$ | | | | $G^{m+1}_{n-1}$ | $B^{m+1}_{n}$ | $G^{m+1}_{n+1}$ | |
| $\vdots$ | $\vdots$ | $\vdots$ | | | | $\vdots$ | | $\ddots$ |

FIG. 3B
PRIOR ART

| R | G | B | G | R |
|---|---|---|---|---|
| B | G | R | G | B |
| R | G | B | G | R |
| B | G | R | G | B |

FIG. 5A

| G₁₁ | B₁₂ | G₁₃ | B₁₄ | G₁₅ | B₁₆ | G₁₇ | B₁₈ |
|---|---|---|---|---|---|---|---|
| 140 | – | 140 | – | 140 | – | 140 | – |

| R₂₁ | G₂₂ | R₂₃ | G₂₄ | R₂₅ | G₂₆ | R₂₇ | G₂₈ |
|---|---|---|---|---|---|---|---|
| – | 100 | – | 100 | – | 100 | – | 100 |

| G₃₁ | B₃₂ | G₃₃ | B₃₄ | G₃₅ | B₃₆ | G₃₇ | B₃₈ |
|---|---|---|---|---|---|---|---|
| 140 | – | 140 | – | 140 | – | 140 | – |

| R₄₁ | G₄₂ | R₄₃ | G₄₄ | R₄₅ | G₄₆ | R₄₇ | G₄₈ |
|---|---|---|---|---|---|---|---|
| – | 100 | – | 100 | – | 100 | – | 100 |

| G₅₁ | B₅₂ | G₅₃ | B₅₄ | G₅₅ | B₅₆ | G₅₇ | B₅₈ |
|---|---|---|---|---|---|---|---|
| 140 | – | 140 | – | 140 | – | 140 | – |

| R₆₁ | G₆₂ | R₆₃ | G₆₄ | R₆₅ | G₆₆ | R₆₇ | G₆₈ |
|---|---|---|---|---|---|---|---|
| – | 100 | – | 100 | – | 100 | – | 100 |

FIG. 5B

| G₁₁ | B₁₂ | G₁₃ | B₁₄ | G₁₅ | B₁₆ | G₁₇ | B₁₈ |
|---|---|---|---|---|---|---|---|
| / | / | / | / | / | / | / | / |

| R₂₁ | G₂₂ | R₂₃ | G₂₄ | R₂₅ | G₂₆ | R₂₇ | G₂₈ |
|---|---|---|---|---|---|---|---|
| / | 120 | 120 | 120 | 120 | 120 | 120 | / |

| G₃₁ | B₃₂ | G₃₃ | B₃₄ | G₃₅ | B₃₆ | G₃₇ | B₃₈ |
|---|---|---|---|---|---|---|---|
| / | 120 | 120 | 120 | 120 | 120 | 120 | / |

| R₄₁ | G₄₂ | R₄₃ | G₄₄ | R₄₅ | G₄₆ | R₄₇ | G₄₈ |
|---|---|---|---|---|---|---|---|
| / | 120 | 120 | 120 | 120 | 120 | 120 | / |

| G₅₁ | B₅₂ | G₅₃ | B₅₄ | G₅₅ | B₅₆ | G₅₇ | B₅₈ |
|---|---|---|---|---|---|---|---|
| / | 120 | 120 | 120 | 120 | 120 | 120 | / |

| R₆₁ | G₆₂ | R₆₃ | G₆₄ | R₆₅ | G₆₆ | R₆₇ | G₆₈ |
|---|---|---|---|---|---|---|---|
| / | / | / | / | / | / | / | / |

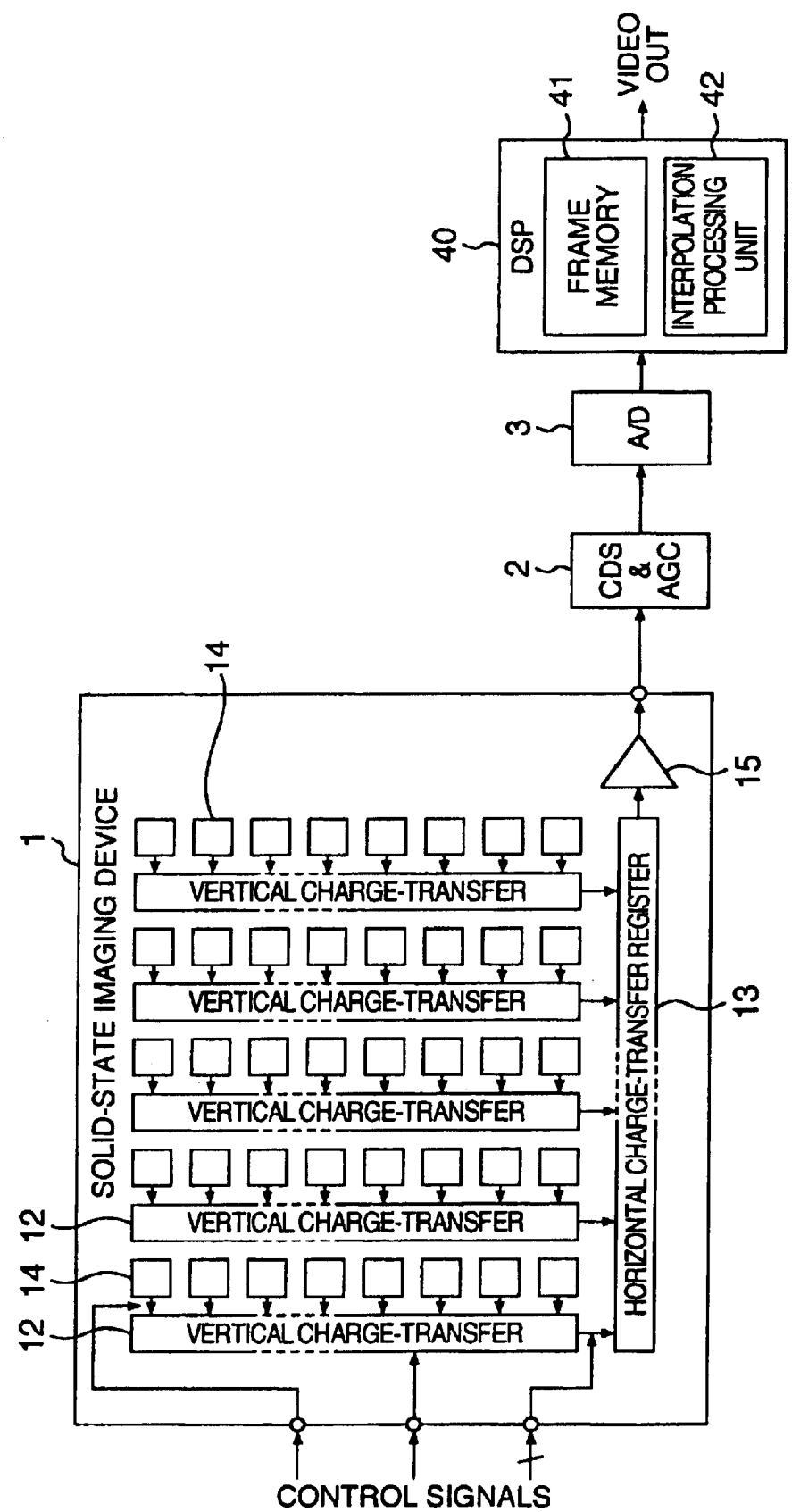

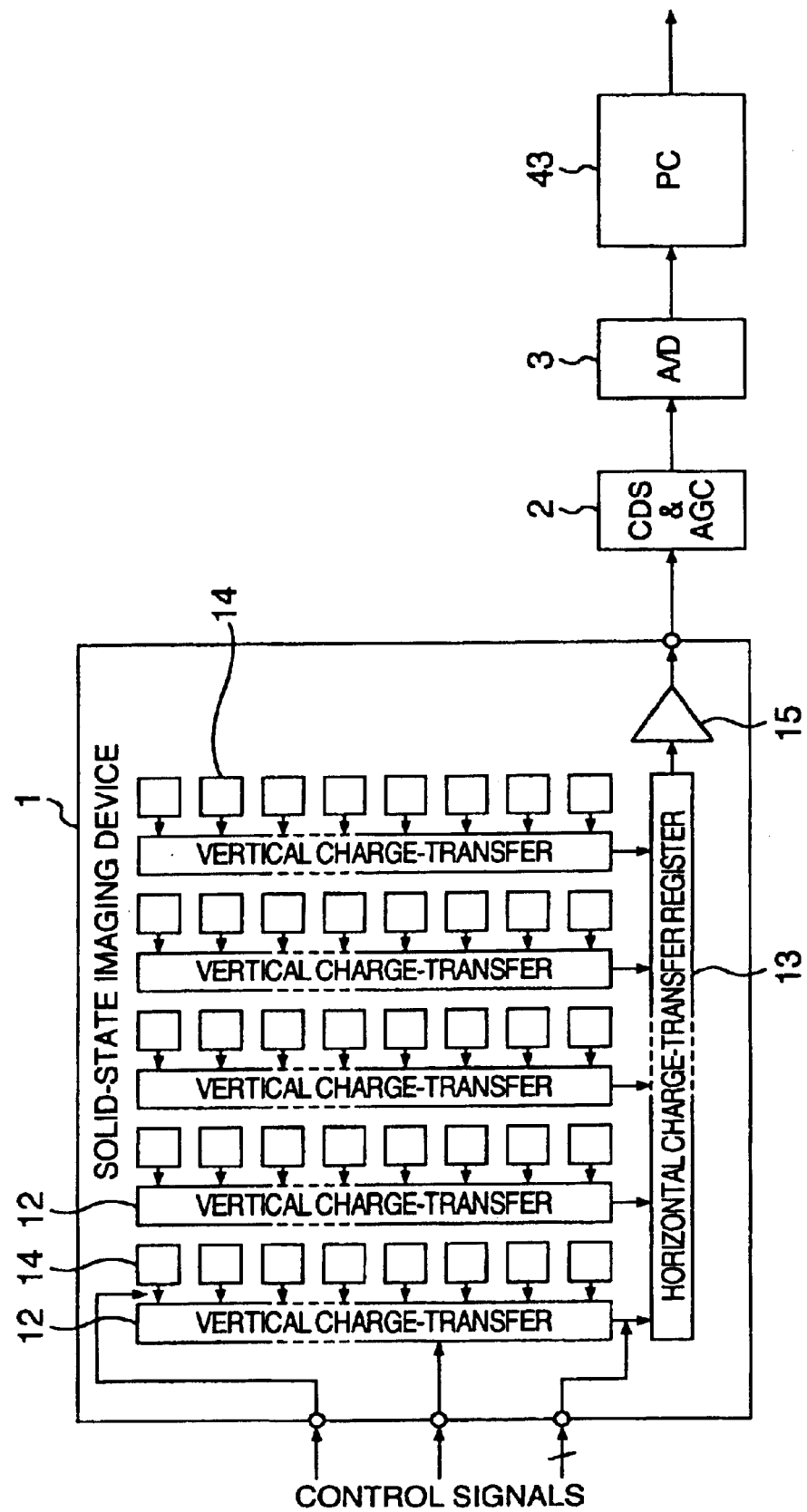

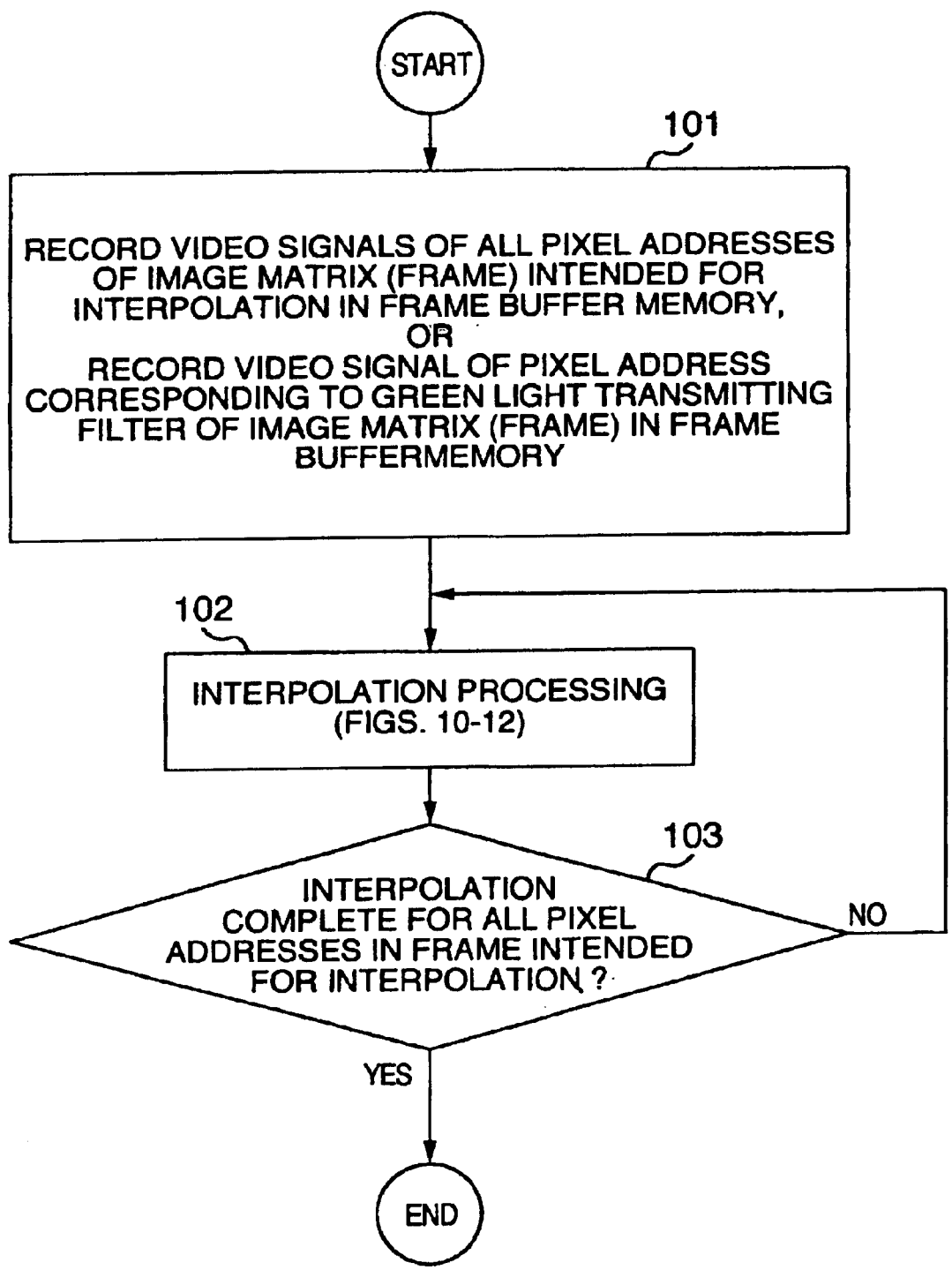

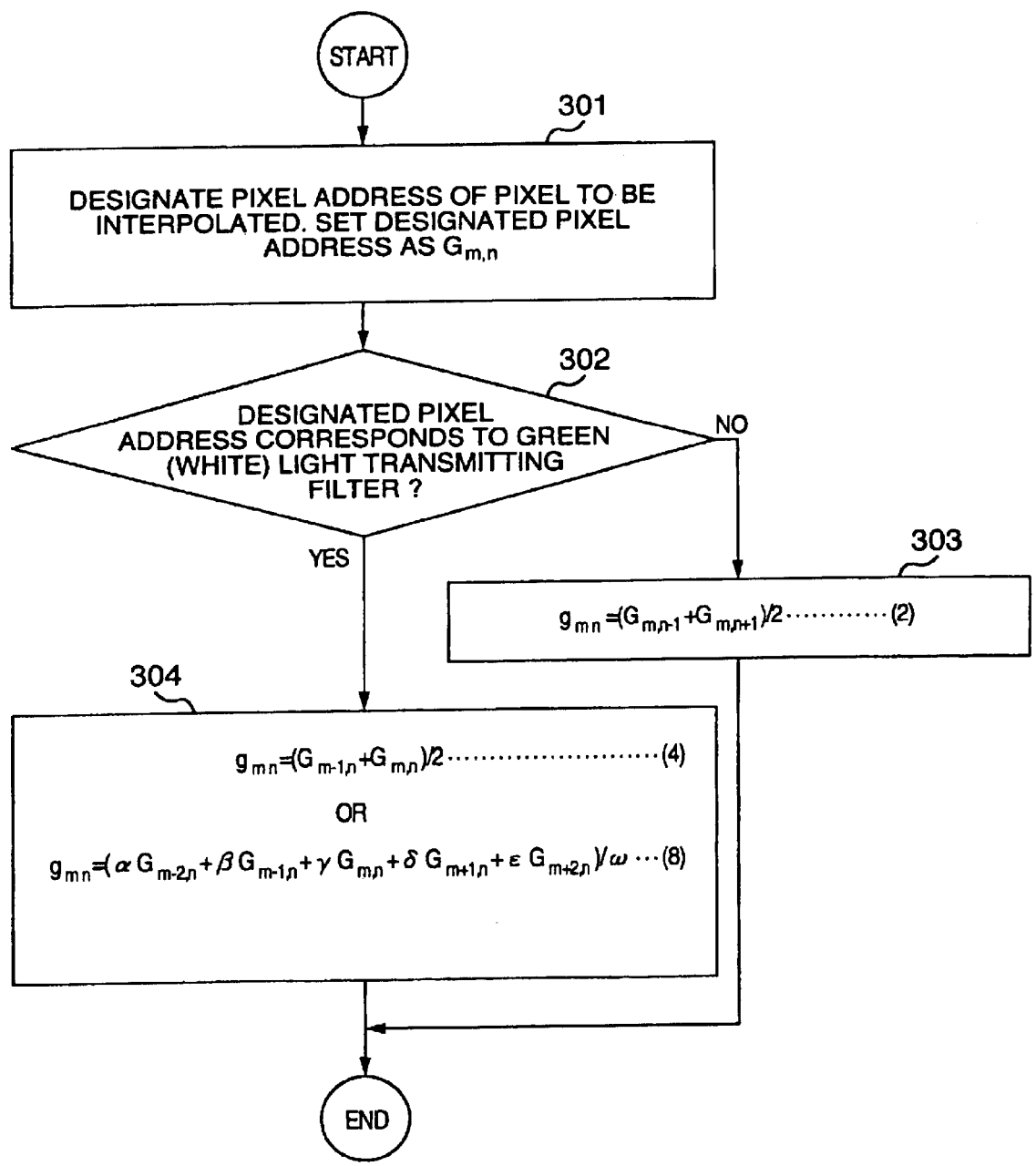

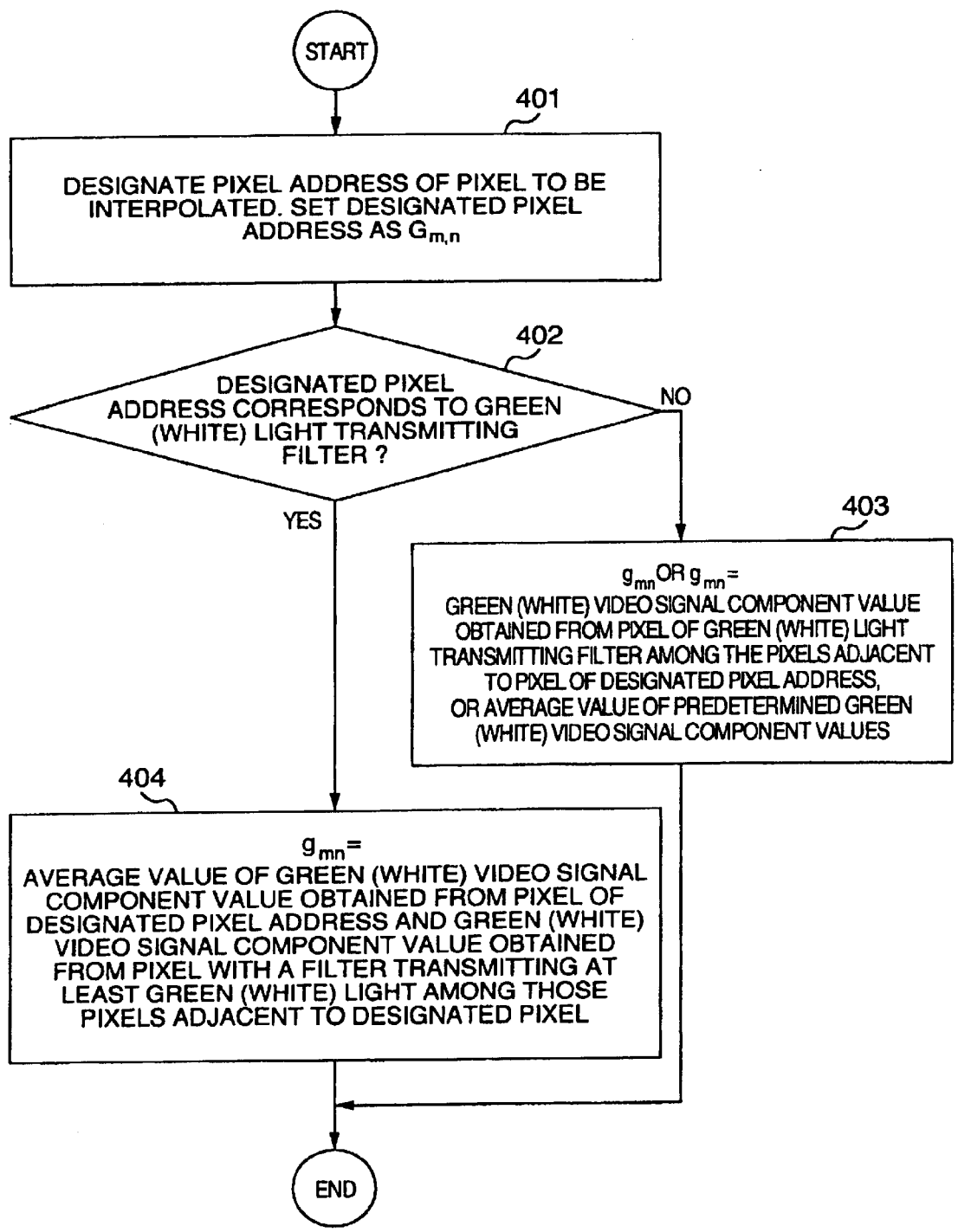

METHOD OF PROCESSING IMAGE SIGNAL FROM SOLID-STATE IMAGING DEVICE, IMAGE SIGNAL PROCESSING APPARATUS, IMAGE SIGNAL GENERATING APPARATUS AND COMPUTER PROGRAM PRODUCT FOR IMAGE SIGNAL PROCESSING METHOD

BACKGROUND OF THE INVENTION

The present invention relates to a method of processing the color component signal (image signal) obtained from a solid-state image pickup device, an image signal processing apparatus, an image signal generating apparatus comprising the image signal processing apparatus and the solid-state image pickup device, and a computer program product for the image signal processing method.

The solid-state image pickup device or the image sensor has a two-dimensional arrangement of a plurality of photoelectric elements such as photodiodes. For example, both the three primary color signals such as R, B and G signals and the luminance signal are produced in a single-chip solid-state image pickup device. A monochromatic color filter of R (red light penetrating), G (green light penetrating) or B (blue light penetrating) is arranged on the light-receiving surface of each photoelectric element. A white filter (a filter of white light penetrating) is arranged in place of the G filter in some cases. A plurality of photoelectric elements including these three types of color filters are arranged on the light-receiving surface in a predetermined pattern such as Bayer arrangement pattern. Hereinafter, we will explain examples wherein each photoelectric element corresponds to a pixel. The solid-state image pickup device is of either CCD type or MOS FET type.

Generally, the color component signals composed of all the three primary colors are required from each pixel for producing high quality full-color image signals. In the single-chip solid-state image pickup device, however, only a monochromatic color component signal corresponding to the color of the filter of a respective photoelectric element of a pixel can be produced in each pixel. In each pixel of a given color in the single-chip solid-state image pickup device the two remaining color component signals are produced in such a manner that the signals from the adjacent pixels having different color filters are subjected to the signal processing such as interpolation.

An example of the image signal processing method as described above is disclosed in U.S. Pat. No. 5,382,976. This US patent describes a signal processing method for a single image sensor including a red pixel, a green pixel and a blue pixel. For the red pixel or the blue pixel not including the green component, the green value is obtained by interpolating the signal values of the pixels adjacent to the particular pixel. Also, the US patent includes the description to the effect that with regard to the green value of phase "00" containing the green value or phase "1 μl", the adjacent pixel values are not interpolated but the signal values of the phases are used as they are without interpolation as indicated by G=G(0,0) in FIGS. 4A and 4B of the U.S. patent.

Now, a specific example of an image signal processing method will be explained with reference to the drawings.

FIG. 2 is a diagram showing an example a block configuration of an image signal processing apparatus comprising a single-chip solid-state image pickup device and various processing circuits for processing the image signal picked up by the solid-state image pickup device. In FIG. 2, reference numeral 1 designates a solid-state image pickup device such as a charge-coupled device (CCD) image sensor for converting the imaging light into electric charge and outputting it as a video signal, numeral 2 a sample-hold and automatic gain control (CDS&AGC) circuit (CDS: Correlated Double Sampling) for sample holding the video signal outputted from the CCD 1 and outputting the video signal by amplifying the sample hold signal to a required level, and numeral 3 an A/D converter for converting the analog video signal from the CDS&AGC circuit 2 into a digital video signal.

Numeral 4 designates a DSP (digital signal processor) circuit for processing the video signal from the A/D converter 3 as required.

The color filters of the solid-state image pickup device (CCD) 1 are arranged in Bayer arrangement pattern. FIG. 3A shows the Bayer arrangement pattern and the arrangement of the pixel addresses attached to the pixels. In FIG. 3A, a green light transmitting filter (a filter of green light penetrating) is designated as G, a red light transmitting filter (a filter of red light penetrating) as R and a blue light transmitting filter (a filter of blue light penetrating) as B. Further, the number 1 is attached to the highest row and the leftmost column. For example, the pixel address of a pixel having a green light transmitting filter located on the mth row from top and the nth column from left is expressed as $G_{m,n}$. The symbol of the pixel address is also expressed as the value of the color component signal obtained by picking up an image in the particular pixel.

A method of image signal processing for the green component signal constituting one of the processes executed in the DSP circuit 4 described above will be explained with reference to FIG. 4C showing an example of the pixel interpolation method. The method (i) or (ii) described below is adaptively used for each pixel address. Specifically, in method (i), as for the green component signal level of a pixel address (e.g. $G_{22}$) having a green light transmitting filter, the value of the green component signal level of the particular pixel address is used as it is. In method (ii), on the other hand, as for the green component signal level of a pixel address (e.g. $R_{23}$) having a red light transmitting filter or the green component signal level of a pixel address (e.g. $B_{34}$) having a blue light transmitting filter, the average value of the green component signal levels obtained from the pixels (e.g. $G_{13}$, $G_{22}$, $G_{24}$, $G_{33}$) having a green light transmitting filter at the upper, lower, left and right adjacent pixel addresses is used.

A specific example of the signal processing method (ii) described above will be explained in more detail. As shown in FIG. 4C, in the case where the image signal is processed for the pixel address $R_{23}$ to generate the green component signal level $g_{23}$ by interpolation, for example, the value is calculated from $$g_{23}=(G_{13}+G_{22}+G_{24}+G_{33})/4 \quad (1)$$

Another method of calculation included in the signal processing method (ii) uses the values of only the left and right adjacent pixels of the pixel address $R_{23}$ as shown in equation (2) below for calculation.

$$g_{23}=(G_{22}+G_{24})/2 \quad (2)$$

Various other alternative methods are conceivable including a method in which only the upper and lower adjacent pixel values or only the diagonally adjacent pixel values of the pixel address $R_{23}$ are used for calculation.

FIG. 4A is a diagram showing an interpolation method for the R component signal at the position of the pixel address $G_{22}$. In this case, the red component signal at the position of $G_{22}$ has a pixel level equal to the average of the imaging red component signal levels of the pixel address $R_{21}$ and the pixel address $R_{23}$. FIG. 4B is a diagram showing an interpolation method for the B component signal at the position of the pixel address $G_{22}$. In this case, the blue component signal at the position of $G_{22}$ has a pixel level equal to the average of the imaging blue component signal levels of the pixel address $B_{12}$ and the pixel address $B_{32}$. Further, FIG. 4D is a diagram showing an interpolation method for the B component signal at the position of the pixel address $R_{23}$. In this case, the blue component signal at the position of $R_{23}$ has a pixel level equal to the average of the imaging blue component signal levels at the respective positions of the pixel addresses $B_{12}$, $B_{14}$, $B_{32}$ and $B_{34}$.

The signal processing method described above has the following problem. Specifically, assume that the band limiting range of the source follower circuit of the amplifier 15 of the output unit of the CCD used for securing the required S/N ratio, the bandwidth of the CDS circuit 2 or the band limiting range of the process amplifier is excessively narrow. Then, the waveform of the output signal is distorted in each case. As a result, a horizontal line having the blue light transmitting filter such as the (m-1)th line (row) in FIG. 3A and the horizontal line having the red light transmitting filter such as the mth line (row) in FIG. 3A have different waveform distortion amounts of the green component signal. Thus, the error levels applied to the green component signals are different between adjacent lines, often resulting in variations of the green component signal level, even when a uniform green component light in the imaging light is applied from the object to each pixel. The green component signals varied from one line to another causes horizontal stripes of noises on the image subjected to the signal processing as shown in FIG. 4C.

Also, in the case where the conditions for the production process undergo a change, the filter characteristic of the green light transmitting filter among the CCD color filters may be varied in every other horizontal scanning line, i.e. between a horizontal line having the blue light transmitting filter and a horizontal line having the red light transmitting filter, which often causes variations of the green component signal level between different lines.

This often leads to the problem that even when a uniform green component light in the imaging light is applied from an object to each pixel, the levels of the green component signals corresponding to the pixels of the green light transmitting filters outputted from the CCD may be varied between even-row horizontal lines and odd-row horizontal lines.

FIGS. 6A and 6B show waveforms obtained by sampling the output signal of the CCD in a correlated double sampling (CDS) circuit when the CCD having the aforementioned problem picks up an object having a uniform brightness and color in a whole picture frame. FIG. 6A shows a signal waveform of a horizontal line (the mth horizontal line in FIG. 3A, for example) having a red light transmitting filter and green one, and FIG. 6B shows a signal waveform of a horizontal line (the (m-1)th horizontal line in FIG. 3A, for example) having a blue light transmitting filter and green one.

In FIGS. 6A and 6B, numerals 100, 200 designate reference voltage signal (for example, an optical black signal) waveforms. Numeral 110 designates an image signal waveform corresponding to the reference voltage signal waveform 100, and numeral 210 designates an image signal waveform corresponding to the reference voltage signal waveform 200. The values of the color component signals of the image signal waveforms 110, 210 are indicated by the level difference with the reference voltage signal waveforms 100, 200, respectively. In the waveform 110, from left to right, the level waveforms of the red component signal, the green component signal and the red component signal are shown, while in the waveform 210, from left to right, the level waveforms of the green component signal, the blue component signal and the green component signal are shown.

Comparison between the green component signal of the waveform 110 in FIG. 6A and the green component signal of the waveform 210 in FIG. 6B shows that the signal levels are different between them due to the problem described above. In the case where an image is displayed on a monitor (not shown) inserted in a subsequent stage, this level difference is seen to cause a level difference between horizontal lines even in a displayed image produced by imaging an object uniformly. Thus the image is displayed in horizontal stripes or speckles, thereby extremely deteriorating the image quality.

SUMMARY OF THE INVENTION

The object of the present invention is to provide means for preventing the unnecessary level difference from being caused between horizontal lines or reducing the unnecessary level difference even in the case where the picking up characteristics of the CCD are varied or the performance thereof is deteriorated and thereby to prevent the deterioration of the image quality which otherwise might be caused by horizontal stripes or speckles on a picked-up image or a part of image by the imaging light from the object.

According to one aspect of the invention, there is provided an image signal processing method for processing the color component signals obtained from a solid-state image pickup device including an arrangement of a plurality of photoelectric elements with color filters arranged in the light receiving section of the photoelectric elements, comprising the steps of fetching a color component signal from a designated pixel corresponding to the photoelectric element located on a line and having a filter that can transmit the green light in the solid-state image pickup device, fetching the color component signals from the pixel corresponding to the photoelectric element on other pixel line than the first line of the designated pixel in the neighborhood of the designated pixel, the neighboring pixels each having a filter for transmitting at least the green light, and determining the value of the color component signal of the designated pixel corresponding to the photoelectric element having the filter that can transmit at least the green light, based on a plurality of the color signals fetched in the foregoing steps.

According to another aspect of the invention, there is provided an image signal processing apparatus for processing the color component signals obtained by a solid-state image pickup device including an arrangement of a plurality of photoelectric elements and a color filter arranged in the light receiving section of each pixel corresponding to the photoelectric element comprising means for fetching the color component signal from a designated pixel corresponding to the photoelectric element having a filter that can transmit at least the green light on the lines of the solid-state image pickup device, means for fetching the color component signal from a pixel corresponding to the photoelectric element on other pixel line than said line of the designated pixel in the neighborhood of the designated pixel, the neighboring pixels each having a filter for transmitting at least the green light, and arithmetic means for determining the value of the color component signal of the designated pixel corresponding to the photoelectric element having the filter that can at least the green light, based on a plurality of the color signals fetched.

According to still another aspect of the invention, there is provided an image signal generating apparatus comprising a solid-state image pickup device including an arrangement of a plurality of photoelectric elements and a color filter arranged in the light receiving section of each pixel corresponding to the photoelectric element, and an image signal processing unit for processing the color component signals obtained by the solid-state image pickup device, wherein the signal processing unit includes means for fetching the color component signal from a designated pixel corresponding to the photoelectric element located on a line of the solid-state image pickup device and having a filter that can transmit at least the green light, means for fetching the color component signals from the pixel corresponding to the photoelectric element located on other lines in the neighborhood of the designated pixel, the neighboring pixels each having a filter capable of transmitting at least the green light, and arithmetic means for determining the value of the color component signal of the designated pixel corresponding to the photoelectric element having a filter capable of transmitting at least the green light, based on a plurality of the color signals fetched.

According to a further aspect of the invention, there is provided a computer program product comprising a computer usable medium having computer readable program code means embodied therein for processing the color component signals obtained by a solid-state image pickup device having an arrangement of a plurality of photoelectric elements with a color filter arranged in the light receiving section of each of the pixels corresponding to the photoelectric elements, wherein the computer readable program code means includes means for fetching the color component signal from a designated pixel corresponding to the photoelectric element located on a line of the solid-state image pickup device and having a filter that can pass at least the green light, means for fetching the color component signals from the pixel corresponding to the photoelectric element in the neighborhood of the designated pixel and located on line different from the designated pixel, the neighboring pixels being located on lines and each having a filter capable of transmitting at least the green light, and means for determining the value of the color component signal of the designated pixel corresponding to the photoelectric element having a filter capable of passing at least the green light, based on a plurality of the color signals fetched.

BRIEF DESCRIPTION OF THE DRAWINGS

FIGS. 3A and 3B are diagrams showing the Bayer arrangement pattern and another arrangement of filters, i.e. pixel addresses attached to the pixels.

FIGS. 5A and 5B are diagrams showing the level of the green component signal of each pixel for the image signal processing method according to the invention.

FIG. 7 is a block diagram showing an image signal generating apparatus including a signal processing apparatus according to an embodiment of the invention.

FIG. 8 is a block diagram showing an image signal generating apparatus including a signal processing apparatus according to another embodiment of the invention.

FIG. 9 shows an example of the main flowchart for interpolation of the green component signal in a signal processing apparatus according to the invention.

FIG. 11 shows an example of the flowchart for the signal processing performed by a signal processing apparatus according to this invention even in the case of a filter arrangement other than the Bayer arrangement pattern shown in FIG. 3B.

FIG. 12 is a flowchart schematically showing the signal processing steps for a signal processing apparatus according to the invention.

DESCRIPTION OF THE EMBODIMENTS

Figure 2:
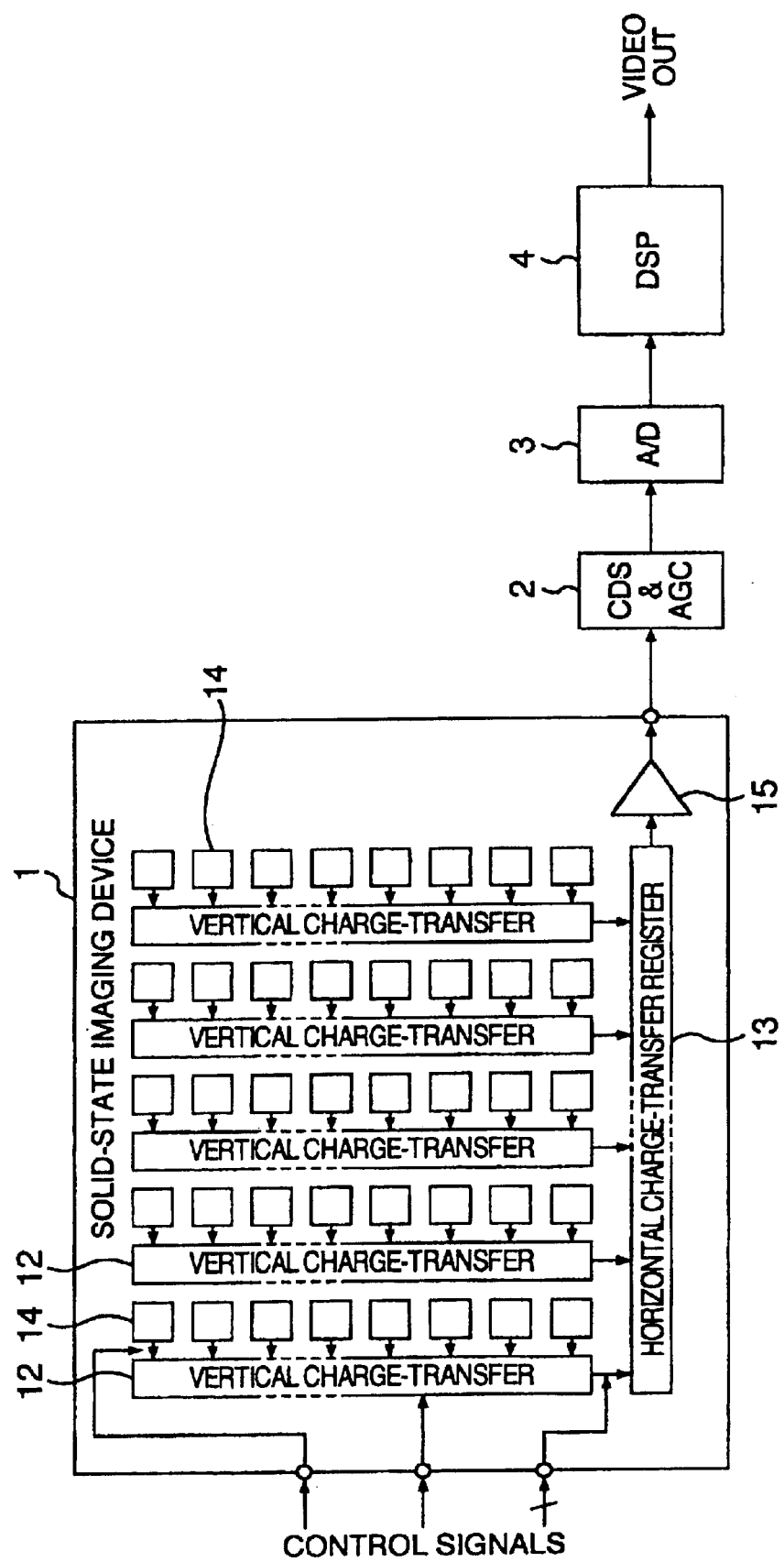
FIG. 2 is a diagram showing an example block configuration of an image signal processing apparatus.
Figure 4A:
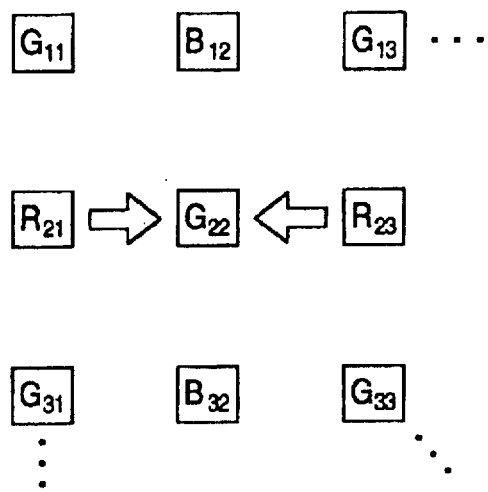
FIGS. 4A, 4B, 4C and 4D are diagrams for explaining an example of the pixel interpolation method.
Figure 4B:
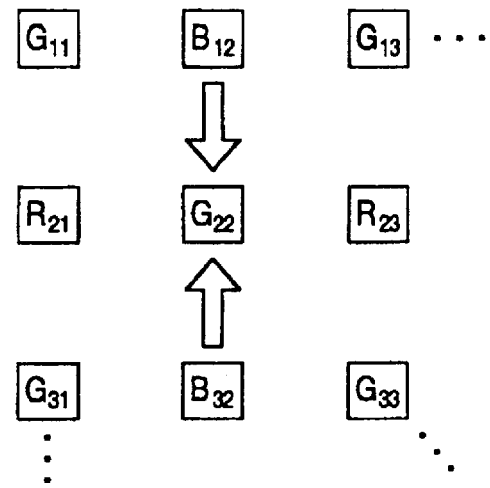
Figure 4C:
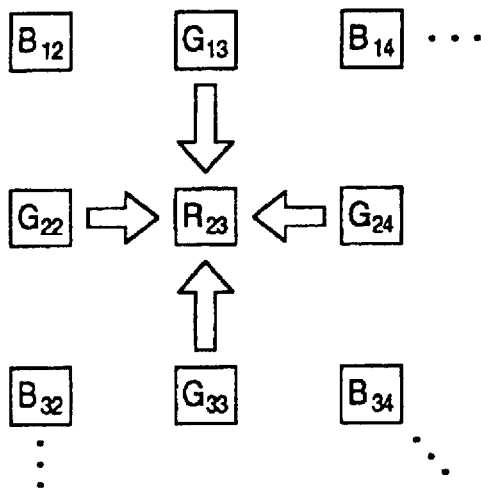
Figure 4D:
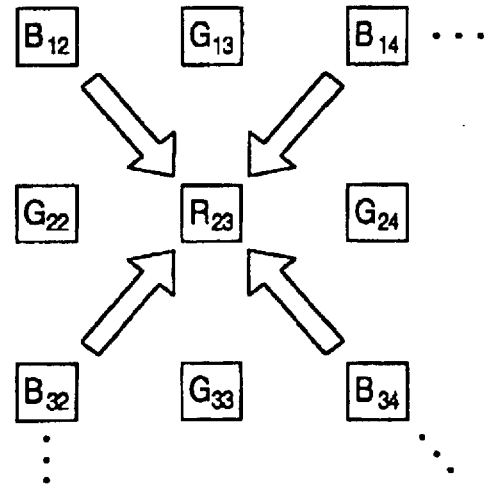
Figure 6A:
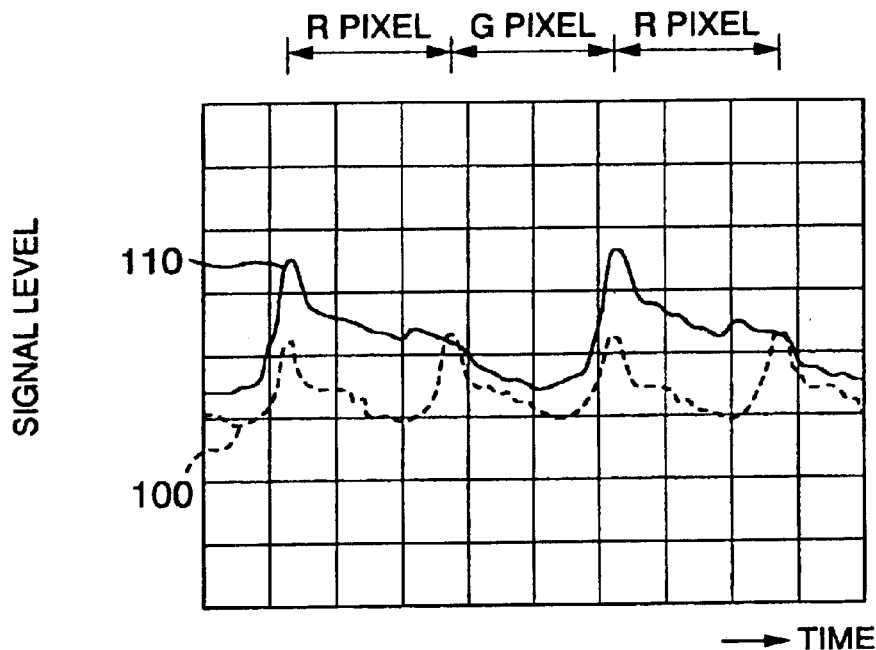
FIGS. 6A and 6B are diagrams showing waveforms for horizontal lines containing the pixels R and B lines sampled from the CCD output signal in a correlated double sampling circuit.
Figure 6B:
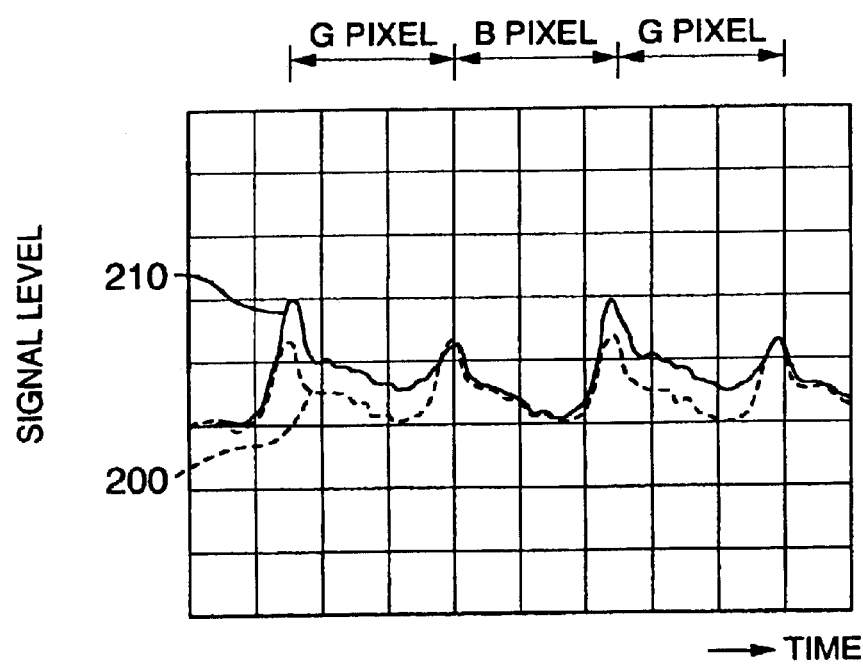

Embodiments of the invention will be explained below. A block configuration of an image signal processing apparatus according to the invention is shown in FIG. 7. In FIG. 7, the same reference numerals as those in FIG. 2 designate the same component elements as the corresponding component elements, respectively, in FIG. 2. Also, the color filters of a CCD 1 are arranged in a manner similar to the Bayer arrangement pattern shown in FIG. 3A, and the indication of the pixel addresses and the symbol of a pixel address is expressed as the value of the color component signal obtained by picking up an image in the particular pixel.

An image signal processing method, i.e. a method of processing the green component signal which is one of the processes carried out in a DSP circuit 40 according to the invention will be explained with reference to FIGS. 1A, 1B and the flowcharts of FIGS. 9 to 12 showing an example of the image signal processing method according to the invention.

FIG. 9 shows the main routine of the image signal processing in the DSP 40 of a signal processing apparatus according to an embodiment of the invention. First, in step 101, the video signals of all the pixel addresses of an image frame to be interpolated are stored in a frame buffer memory 41 from an A/D converter 3. As an alternative, the video signal of a pixel address $G_{m,n}$ corresponding to a green light transmitting filter of the image frame is stored in the frame buffer memory 41.

In step 102, an interpolation process is carried out in an interpolation processing unit 42 for determining the green component value among the three color component signal values at the respective positions of the green pixel, the red pixel and the blue pixel. Hereinafter, the green pixel means a pixel corresponding to the photoelectric element provided with a color filter transmitting at least green light, the red pixel means a pixel corresponding to the photoelectric element provided with a color filter transmitting red light, and the blue pixel means a pixel corresponding to the photoelectric element provided with a color filter transmitting blue light. The green pixel may be replaced by a white pixel having a white filter which transmits green light and other particular color component light. A specific flow of the process performed in step 102 will be explained with reference to the interpolation processing flows shown in FIGS. 10 and 11. In step 103, it is determined whether the interpolation processing is complete for all the pixel addresses in an image frame intended for interpolation, and the process of steps 102 and 103 is repeated until the value of the green component is determined for all the pixel addresses.

Now, a specific subroutine of step 102 will be explained.

First, in the interpolation method shown in FIG. 1A, the signal value of the green pixel is determined by method (i') described below in accordance with the pixel address. Further, method (ii) is adaptively applied for each of red and blue pixel addresses.

(i') The green component signal of a pixel address $G_{m,n}$ having a green light transmitting filter is the average of the value of the green component signal obtained for the particular pixel address $G_{m,n}$ and the value of the green component signal picked up by the pixel of the pixel address $G_{m-1,n-1}$ on the immediately left column on the immediately upper row than the pixel address $G_{m,n}$.

In a specific example of application of method (i') described above, as shown in FIG. 1A, consider the case in which a green component signal level $g_{22}$ is obtained by the processing the image signal for the pixel address $G_{22}$. The value is calculated from $$g_{22}=(G_{11}+G_{22})/2 \quad (3)$$

This equation can be rewritten into a general expression below.

$$g_{mn}=(G_{m-1,n-1}+G_{m,n})/2 \quad (4)$$

In the method shown in FIG. 1B, on the other hand, the method (i") described below is carried out in accordance with the pixel address followed by adaptively carrying out the method (ii) described above.

(i") The green component signal of a pixel address $G_{m,n}$ having a green light transmitting filter is a weighted average of the value of the green component signal picked up in the particular pixel and the values of the green component signals obtained in the pixels having a green light transmitting filter at the four pixel addresses $G_{m-1,n-1}$, $G_{m-1,n+1}$, $G_{m+1,n-1}$, $G_{m+1,n+1}$ diagonally upper and lower than the particular pixel address $G_{m,n}$.

Figure 1A:
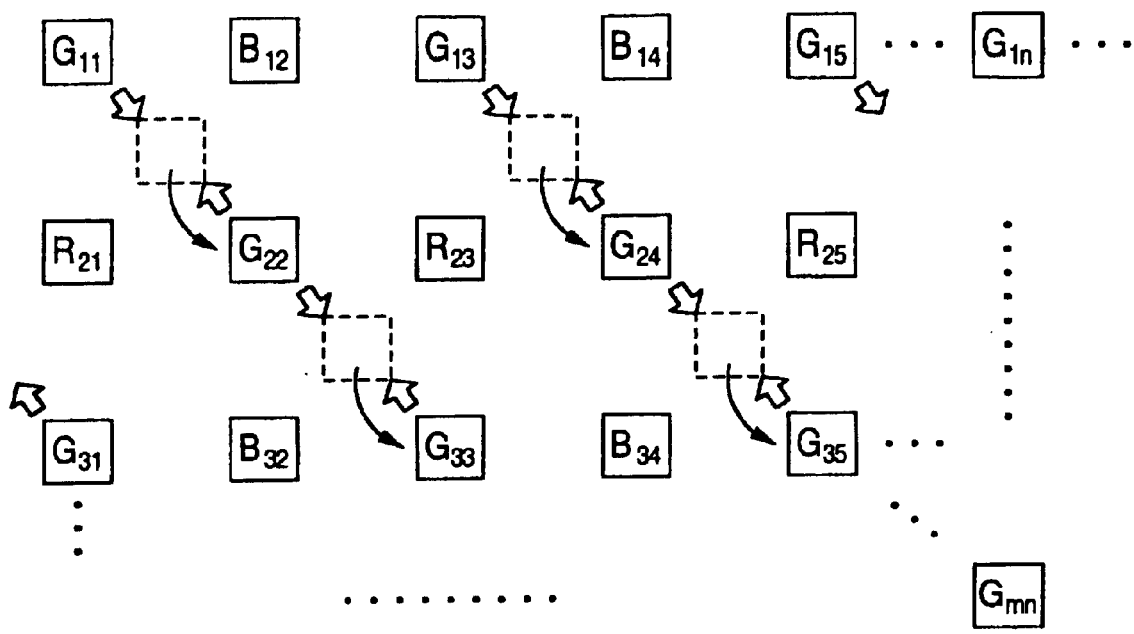
FIGS. 1A and 1B are diagrams for explaining an example of an image signal processing method according to the invention.
Figure 1B:
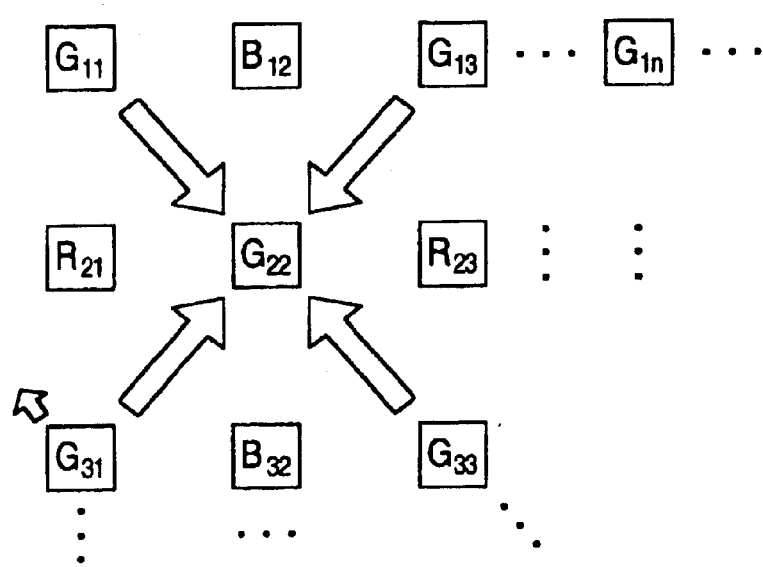

As a specific example, as shown in FIG. 1B, for example, assume that the green component signal level $g_{22}$ is to be obtained by image signal processing for the pixel address $G_{22}$. The value is calculated as shown below, $$g_{22}=(G_{11}+G_{13}+G_{22}+G_{31}+G_{33})/5 \quad (5)$$

or by weighting pixel address $G_{22}$ more than other pixel addresses as shown below.

$$g_{22}=(G_{11}+G_{13}+4G_{22}+G_{31}+G_{33})/8 \quad (6)$$

Equations (5) and (6) can be rewritten into general expressions shown below.

$$g_{mn}=(\alpha G_{m-1,n-1}+\beta G_{m-1,n+1}+\gamma G_{m,n}+\delta G_{m+1,n-1}+\delta G_{m+1,n-1})/\omega, \quad (7)$$

where $\omega=\alpha+\beta+\gamma+\delta$.

Figure 10:
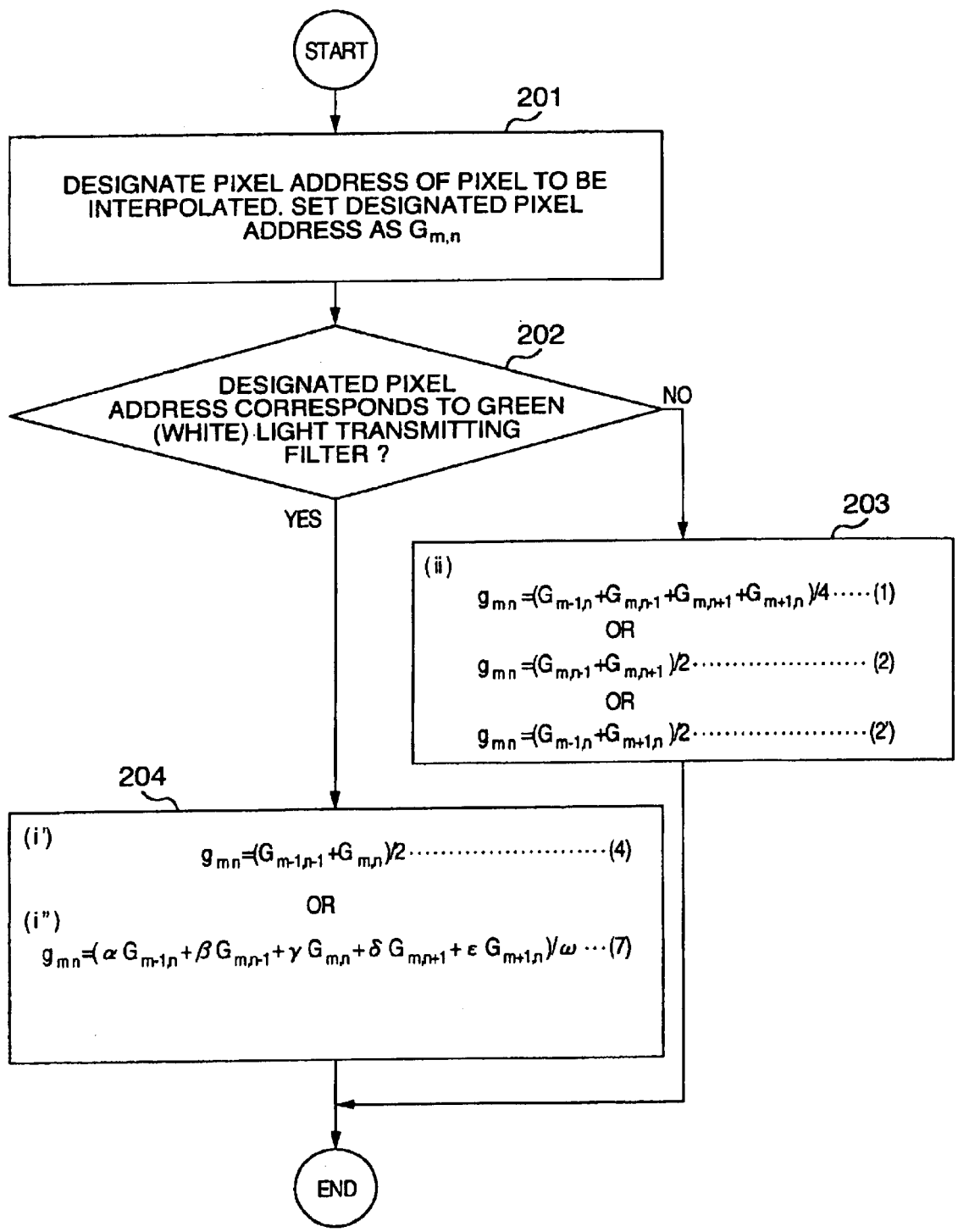
FIG. 10 shows an example of the flowchart for the signal processing performed in a signal processing apparatus according to this invention as shown in FIG. 1A or FIG. 1B.

FIG. 10 is a flowchart for the aforementioned interpolation processing method according to an embodiment. This flow is a flow of the interpolation processing of step 102 in the main flow shown in FIG. 9. First, in step 201, the pixel address of the pixel intended for interpolation is designated. Assume that the designated pixel address is $G_{m,n}$ (m, n: positive integers). In step 202, it is determined whether the designated pixel address is that of the pixel having a green (white) light transmitting filter or not. In the case where the designated pixel is not a green (white) pixel, the pixel data is read from the frame memory 41 and the data values of the red and blue pixels are determined by equation (1), (2) or (2') in step 203. In the case where the designated pixel is a green (white) pixel, on the other hand, the pixel data are read from the frame memory 41 and the data value of the green pixel is determined according to equation (4) or (7) in step 204.

Various other calculation methods than the methods (i') and (i") are conceivable for the image processing method according to the invention.

In the pattern of FIG. 1A, for example, the green signal value of the designated pixel address $G_{m,n}$ may be determined using the average value of the upper right pixel address $G_{m-1,n+1}$ and the lower left pixel address $G_{m+1,n-1}$ each adjacent to the pixel address $G_{m,n}$. Also, the green pixel on a horizontal line other than the upper and lower adjacent horizontal lines can be used as the green signal value of the designated pixel address $G_{m,n}$.

The signal processing method and apparatus according to the invention described above are not limited to the image pickup device having the Bayer arrangement pattern, but is also applicable to other patterns of arrangement. For example, FIG. 11 shows a flowchart of interpolation for the color filter arrangement pattern shown in FIG. 3B. This flow is a routine in step 102 of the main flow shown in FIG. 9.

First, the pixel address of the pixel intended for interpolation is designated in step 301. Assume that the designated pixel address is $G_{m,n}$ (m, n: positive integers). In step 302, it is determined whether the designated pixel address is that of a pixel having a green (white) light transmitting filter or not. In the case where the designated pixel is not a green (white) one, the pixel data is read out from the frame memory 41 and the data values of the red and blue pixels are determined according to equation (2) in step 303. In the case the designated pixel is a green (white) pixel, on the other hand, the pixel data is read out from the frame memory 41 and the data value of the green pixel is determined in accordance with equation (4) or (8) in step 304. Here, equation (8) is disclosed below.

$$g_{mn}=(\alpha G_{m-2,n}+\beta G_{m-1,n}+\gamma G_{m,n}+\delta G_{m+1,n}+\delta G_{m+2,n})/\omega, \quad (8)$$

where $\omega=\alpha+\beta+\gamma+\delta+\epsilon$.

FIG. 12 is a flowchart showing the interpolation processing of step 102 in FIG. 9, i.e. the flow of FIGS. 10 and 11 in broader term. Steps 401, 402 are similar to steps 201, 202, respectively, in FIG. 10. In step 403, the green component signal value $g_{mn}$ in the red pixel and the green component signal value $g_{mn}$ in the blue pixel are determined using the green (white) video signal component value obtained from the pixel of a green (white) light transmitting filter among those pixels adjacent to the pixel of the designated pixel address or the average of the predetermined green (white) component signal value. Further, in step 404, the green component signal value $g_{mn}$ of the green pixel is determined from the average of the green (white) component signal value obtained from the pixel of the designated pixel address and the green (white) component signal value obtained from at least one pixel of green (white) light transmitting filter among those pixels adjacent to the particular designated pixel.

The behavior of the image signal level in the case of the image processing is conducted using an example of the image processing method according to the invention described above will be explained with reference to FIGS. 5A and 5B. FIGS. 5A and 5B show the level of the green component signal of each pixel while omitting the level of the red component signal and the blue component signal.

FIGS. 5A and 5B are diagrams showing, in a matrix for each pixel address, the behavior of the green component signal (image signal) before and after the processing of an image picked up from a uniform object using the method of FIG. 1A according to the invention. FIG. 5A shows the image signal level picked up before the image processing according to the invention, and FIG. 5B shows the image signal level obtained as the result of the image processing according to the invention.

FIG. 5A shows the manner in which the green component signal level assumes different values of 140 and 100 between odd rows, i.e. horizontal lines having a blue light transmitting filter and even rows, i.e. horizontal lines having a red light transmitting filter. In contrast, FIG. 5B shows the manner in which the image signal processing is conducted so that the green component signal level value is 120 for both odd rows, i.e. the horizontal lines having a blue light transmitting filter and even rows, i.e. the horizontal lines having a red light transmitting filter.

The reason why the value of the green component signal level is 120 for both cases is that the image signal processing by the use of the method shown in FIG. 1A produces a green component signal level value 120 obtained by an average of 140 and 100 which are signal levels before the interpolation. Also, as for the values of the pixels having either a red light transmitting filter or a blue light transmitting filter, the green component signal level value assumes 120 as the result of using the aforementioned interpolation technique.

The foregoing description of embodiments refers to the case in which the image signal processing according to the invention is performed in the DSP circuit 40. Nevertheless, the method according to the invention can be implemented in other than the DSP circuit 40. As shown in FIG. 8, for example, a personal computer 43 in which a picked up image signal is input can perform the image processing according to the invention and records the processing result or outputs the processed signal to the stages subsequent to the personal computer.

The flowcharts shown in FIGS. 9, 10, 11 and 12 according to embodiments of the invention can be stored in any of various media (not shown) such as a magnetic disk, an optical disk and a semiconductor memory in the form of a program code readable by the computer or the microprocessor, and the program is read from the recording medium by the DSP 40 or the personal computer 43 thereby to execute the steps of the flowchart. Also, the program code can be downloaded to the DSP 40 or the personal computer 43 through a communication channel (not shown) to carry out the signal processing method according to the invention.

It will thus be understood from the foregoing description that according to this invention, even in the case where the green component signal level is different between odd and even horizontal scanning lines due to the variations of the CCD characteristics or the performance deterioration thereof, the image quality deterioration can be prevented and a clear image can be produced without causing a horizontal striped pattern or speckles on a picked-up image or a part of image by the imaging light from the object by preventing the unnecessary level difference from occurring between horizontal lines or reducing such level difference.

What is claimed is:

1. An image signal processing method for processing a color component signal obtained by a solid-state image pickup device including an arrangement of a plurality of a photoelectric elements and a color filter arranged in the light receiving section of each of the pixels corresponding to the photoelectric elements, comprising the steps of:

storing a first color component signal from a designated pixel corresponding to the photoelectric element having a filter capable of passing at least green light on a line of said solid-state image pickup device in a memory device;

storing a second color component signal from at least one pixel in the neighborhood of said designated pixel corresponding to said photoelectric element in said memory device, the neighboring pixel having a filter for transmitting at least the green light on a line different from said line; and interpolating the value of said first color component signal based on the value of said second color component signal in an interpolation processing unit, wherein said designated pixel is a pixel corresponding to the photoelectric element on a horizontal line, and the pixel in the neighborhood of said designated pixel includes a pixel on another horizontal line adjacent to said designated pixel, and wherein the average of said first and second color component signals is calculated, and the value of said first color component signal is interpolated based on said average of said first and second color component signals.

2. An image signal processing method for processing a color component signal obtained by a solid-state image pickup device including an arrangement of a plurality of a photoelectric elements and a color filter arranged in the light receiving section of each of the pixels corresponding to the photoelectric elements, comprising the steps of:

storing a first color component signal from a designated pixel corresponding to the photoelectric element having a filter capable of passing at least green light on a line of said solid-state image pickup device in a memory device;

storing a second color component signal from at least one pixel in the neighborhood of said designated pixel corresponding to said photoelectric element in said memory device, the neighboring pixel having a filter for transmitting at least the green light on a line different from said line; and interpolating the value of said first color component signal based on the value of said second color component signal in an interpolation processing unit, wherein said designated pixel is a pixel corresponding to the photoelectric element on a horizontal line, and the pixel in the neighborhood of said designated pixel includes a pixel on another horizontal line adjacent to said designated pixel, and wherein said solid-state image pickup device includes a Bayer arrangement pattern having pixels corresponding to the photoelectric element with a red light pass filter, a pixel corresponding to the photoelectric element with a filter capable of transmitting at least the green light and a pixel corresponding to the photoelectric element with a blue light transmitting filter, and in the case where each of said pixels can be specified by the row number m of a horizontal line and the column number n of vertical line orthogonal to said horizontal line of said solid-state image pickup device (m, n: arbitrary positive integer), assuming that the color signal component of said designated pixel having a filter capable of transmitting at least the green light on said horizontal line is given as $G_{m,n}$, the value of the color component signal of said designated pixel having a filter capable of transmitting at least the green light is determined by at least selected one of the formulae $(G_{m1, n-1}+G_{m,n})/2$, $(G_{m+1, m+1}+G_{m,n})/2$, $(G_{m-1, n+1}+G_{m,n})/2$ and $(G_{m+1, n-1}+G_{m,n})/2$.

3. An image signal processing apparatus for processing a color component signal obtained by a solid-state image pickup device including an arrangement of a plurality of photoelectric elements and a color filter arranged in the light receiving section of each of the pixels corresponding to the photoelectric element, comprising:

a memory for storing a first color component signal from a designated pixel corresponding to the photoelectric element having a filter capable of transmitting at least a green light on a line of said solid-state image pickup device, said memory storing a second color component signal from a pixel corresponding to the photoelectric element in the neighborhood of said designated pixel, said neighboring pixel having a filter capable of transmitting at least a green light on a line different from said designated line; and an interpolation processing unit for interpolating the value of said first color component signal based on the value of said second color component signal, wherein said designated pixel is a pixel corresponding to the photoelectric element on a horizontal line, and said pixel in the neighborhood of said designated pixel includes a pixel on another horizontal line adjacent to said designated pixel, and wherein said interpolation processing unit interpolates the value of said first color component signal based on average value of said first and second color component signals.

4. An image signal processing apparatus for processing a color component signal obtained by a solid-state image pickup device including an arrangement of a plurality of photoelectric elements and a color filter arranged in the light receiving section of each of the pixels corresponding to the photoelectric element, comprising:

a memory for storing a first color component signal from a designated pixel corresponding to the photoelectric element having a filter capable of transmitting at least a green light on a line of said solid-state image pickup device, said memory storing a second color component signal from a pixel corresponding to the photoelectric element in the neighborhood of said designated pixel, said neighboring pixel having a filter capable of transmitting at least a green light on a line different from said designated line; and an interpolation processing unit for interpolating the value of said first color component signal based on the value of said second color component signal, wherein said designated pixel is a pixel corresponding to the photoelectric element on a horizontal line, and said pixel in the neighborhood of said designated pixel includes a pixel on another horizontal line adjacent to said designated pixel, and, wherein in the case where said solid-state image pickup device has a Bayer arrangement pattern of pixels corresponding to the photoelectric element with a red light transmitting filter, a pixel corresponding to the photoelectric element with a filter capable of transmitting at least the green light and a pixel corresponding to the photoelectric element with a blue light transmitting filter, and each of said pixels can be specified by the row number m of a horizontal line and the column number n of the vertical line orthogonal to said horizontal line of said solid-state image pickup device (m, n: arbitrary positive integer), assuming that the color signal component of said designated pixel corresponding to the photoelectric element having a filter capable of transmitting at least the green light on a horizontal line is given as $G_{m,n}$, said interpolation processing unit determines the value of the color component signal of said designated pixel having a filter capable of transmitting at least the green light by at least selected one of the equations $(G_{m-1, n-1}+G_{m,n})/2$, $(G_{m+1, n+1}+G_{m,n})/2$, $(G_{m-1, n+1}+G_{m,n})/2$ and $(G_{m+1, n-1}+G_{m,n})/2$.

5. An image signal generating apparatus comprising a solid-state image pickup device including an arrangement of a plurality of photoelectric elements and a plurality of color filters arranged in the light receiving sections of the pixels corresponding to the photoelectric element, respectively, and an image signal processing unit for processing the color component signal obtained by said solid-state image pickup device, wherein said signal processing unit includes:

a memory for storing a first color component signal from a designated pixel corresponding to the photoelectric element having a filter capable of transmitting at least a green light on a line of said solid-state image pickup device, said memory storing a second color component signal from a pixel corresponding to the photoelectric element in the neighborhood of said designated pixel, said neighboring pixel having a filter for transmitting at least a green light on a line different from said designated line; and an interpolation processing unit for interpolating the value of said first color component signal based on the value of said second color component signal, wherein said designated Pixel is a pixel corresponding to the photoelectric element on a horizontal line, and the pixel in the neighborhood of said designated pixel includes a pixel on another horizontal line adjacent to said designated pixel, and wherein said interpolation processing unit interpolates the value of said first color component signal based on an average value of said first and second color component signals.

6. An image signal generating apparatus according to claim 5, wherein in the case where said solid-state image pickup device has a Bayer arrangement pattern of pixels corresponding to the photoelectric element with a red light transmitting filter, a pixel corresponding to the photoelectric element with a filter capable of transmitting at least the green light and a pixel corresponding to the photoelectric element with a blue light transmitting filter, and each of said pixels can be specified by the row number m of a horizontal line and the column number n of the vertical line orthogonal to said horizontal line of said solid-state image pickup device (m, n: arbitrary positive integer), assuming that the color signal component of said designated pixel corresponding to the photoelectric element having a filter capable of transmitting at least the green light on a horizontal line is given as $G_{m,n}$, said interpolation processing unit determines the value of the color component signal of said designated pixel having a filter capable of transmitting at least the green light by at least selected one of the equations $(G_{m-1, n-1}+G_{m,n})/2$, $(G_{m+1, n+1}+G_{m,n})/2$, $(G_{m-1, n+1}+G_{m,n})/2$ and $(G_{m+1, n+1}+G_{m,n})/2$.

7. A computer program product comprising:

a computer usable medium having computer readable program code means embodied therein for processing the color component signal obtained by a solid-state image pickup device having an arrangement of a plurality of photoelectric elements and a color filter arranged in the light receiving section of each of said pixels corresponding to the photoelectric element, said computer readable program code means comprising:

means for storing a first color component signal from a designated pixel corresponding to the photoelectric element having a filter capable of passing the green light on a line of said solid-state image pickup device in a memory device;

means for storing a second color component signal from at least one pixel in the neighborhood of said designated pixel corresponding to said photoelectric element in said memory device, the neighboring pixel corresponding to the photoelectric element having a filter for transmitting at least the green light on a line different from said designated pixel line; and means for interpolating the value of said first color component signal based on the value of said color component signal in an interpolation processing unit, wherein said designated pixel is a pixel corresponding to the photoelectric element on a horizontal line, and the pixel in the neighborhood of said designated pixel includes a pixel on another horizontal line adjacent to said designated pixel, and wherein an average of said first and second color component signals is calculated, and the value of said first color component signal is interpolated based on said average of said first and second color component signals.

8. A computer program product according to claim 7, wherein said solid-state image pickup device includes a Bayer arrangement pattern having pixels corresponding to the photoelectric element with a red light pass filter, a pixel corresponding to the photoelectric element with a filter capable of transmitting at least the green light and a pixel corresponding to the photoelectric element with a blue light transmitting filter, and in the case where each of said pixels can be specified by the row number m of a horizontal line and the column number n of vertical line orthogonal to said horizontal line of said solid-state image pickup device (m, n: arbitrary positive integer), assuming that the color signal component of said designated pixel having a filter capable of transmitting at least the green light on said horizontal line is given as $G_{m,n}$, the value of the color component signal of said designated pixel having a filter capable of transmitting at least the green light is determined by at least selected one of the formulae $(G_{m-1, n-1}+G_{m,n})/2$, $(G_{m+1, n+1}+G_{m,n})/2$, $G_{m-1, n-1}+(g_{m,n})/2$ and $(G_{m+1, n-1}+G_{m,n})/2$.

* * * * *